US009415507B2

(12) United States Patent
Foster et al.

(10) Patent No.: US 9,415,507 B2
(45) Date of Patent: Aug. 16, 2016

(54) MOTION BASE WITH CONTROLLED ACTUATORS

(71) Applicant: Oceaneering International, Inc., Houston, TX (US)

(72) Inventors: Samuel T Foster, Perry Hall, MD (US); Eric A King, Westminster, MD (US); Stephen F Fromyer, Silver Spring, MD (US); Stephen Sywak, Glen Brunue, MD (US)

(73) Assignee: OCEANEERING INTERNATIONAL, INC., Houston, TX (US)

( * ) Notice: Subject to any disclaimer, the term of this patent is extended or adjusted under 35 U.S.C. 154(b) by 119 days.

(21) Appl. No.: 14/566,271

(22) Filed: Dec. 10, 2014

(65) Prior Publication Data
US 2016/0167224 A1  Jun. 16, 2016

Related U.S. Application Data
(60) Provisional application No. 61/914,236, filed on Dec. 10, 2013.

(51) Int. Cl.
*G05B 19/29* (2006.01)
*B25J 9/12* (2006.01)
*F16H 25/20* (2006.01)
*G05B 11/01* (2006.01)

(52) U.S. Cl.
CPC ............... *B25J 9/123* (2013.01); *F16H 25/20* (2013.01); *G05B 11/011* (2013.01)

(58) Field of Classification Search
CPC .................................. G01M 1/22; B25J 9/123
USPC .................................. 318/601; 700/275, 279
See application file for complete search history.

(56) References Cited

U.S. PATENT DOCUMENTS

| 2010/0185333 | A1* | 7/2010 | Oosting | F24J 2/38 700/279 |
| 2010/0276570 | A1* | 11/2010 | Moser | F24J 2/38 250/203.4 |
| 2011/0163222 | A1* | 7/2011 | Moser | F24J 2/38 250/203.4 |
| 2012/0180846 | A1* | 7/2012 | Gonzalez Rodriguez | F24J 2/5424 136/246 |
| 2016/0140862 | A1* | 5/2016 | Van Lookeren Campagne | G09B 9/12 434/55 |

* cited by examiner

Primary Examiner — Erick Glass
(74) Attorney, Agent, or Firm — Maze IP Law, PC

(57) ABSTRACT

A motion base comprises lower and upper plates, a plurality of lateral stabilizers coupled in-between and connected to the lower and upper plates, a plurality of actuators, and one or more associated active controllers. Actuators typically comprise a body operatively connected to the upper plate and the lower plate, a rod movably disposed at least partially within the body, where the rod and body define an actuator effective length; and a controllable rod extender configured to selectively extend the rod out from and retract the rod into the body. After determining a desired parameter such as length and an actual parameter such as length, velocity, acceleration, impulse, force, or the like, or a combination thereof for each of the plurality of actuators, a control signal is sent to each controllable rod extender as needed to change the current effective state of that parameter of each actuator by moving each such actuator's extendable rod into or out from each such actuator's body such that the current parameter for each of the plurality of actuators matches the desired parameter for that actuator.

20 Claims, 7 Drawing Sheets

MOTION BASE WITH CONTROLLED ACTUATORS

RELATION TO OTHER APPLICATIONS

The application claims priority through U.S. Patent Application 61/914,236 filed Dec. 10, 2013.

FIELD OF THE INVENTION

The invention relates to an apparatus having, or supporting, a platform, where the platform is movable about a point with two or more degrees of freedom. One such apparatus may be referred to as a motion base. Motion bases find utility, for example, in motion simulators and amusement park rides.

BACKGROUND

In the past, vehicles that moved through amusement park rides simply transported passengers through the ride, from scene to scene. In order to improve the experience of a rider, vehicles became more complex. In many of the newest vehicles, passengers are seated atop a motion base. The motion base enhances a rider's experience by changing the rider's orientation with respect to the vehicle as the vehicle carries the motion base (and passengers) through the amusement park ride.

With reference to a three dimensional coordinate system, having three orthogonal axes, one can describe the motion of a body (e.g., a platform atop a motion base) in three dimensional space by making reference to the number of "degrees of freedom" the body can experience. The six degrees of freedom most typically described are the three motions corresponding to translations of the body along the three orthogonal axes, and the three motions corresponding to the rotation of the body about the three orthogonal axes. Translations forward and backward may be referred to as surge. Translations upward and downward may be referred to as heave. Translations to the left and right may be referred to as sway. Rotation about the vertical axis may be referred to as yaw. Rotations about a longitudinal horizontal axis may be referred to as roll. Rotation about a transverse horizontal axis may be referred to as pitch. An airplane is useful example to describe the three motions corresponding to the rotations of the body (i.e., the airplane) about the three perpendicular axis. Changes in pitch are visually exemplified by the upward/downward tipping of the airplane's nose with respect to its tail. Changes in roll are visually exemplified by the left/right tipping of an aircraft's wingtip above or below the opposing wingtip. Changes in yaw are visually exemplified by clockwise/counterclockwise rotations of the airplane parallel to a horizontal plane, similar to the rotation of a compass needle with respect to the compass face. Everyday vehicles, such as automobiles, may experience less than all of the motions under normal operating conditions. Vehicles, such as airplanes, may experience all six motions, although the changes in motion may be so gentle that a passenger does not recognize that the changes are occurring.

For example, in the day-to-day experiences of passengers aboard a commercial aircraft, passengers are often unaware of (that is, they do not perceive of) the movement of the airplane relative to the Earth. Exceptions to this observation involve abrupt movements, such as a sudden change in altitude, or such as the immediate stop in vertical motion associated with a landing. The same unawareness is true of automobile passengers who, for example, may be unaware of the gradual banking (change in roll) of the automobile as the automobile speeds through a gradual turn on a highway. Humans may not tend to notice gradual changes in motion because these changes are not generally undesirable.

However, it appears to be a natural human instinct to notice, even subconsciously, a rapid change in motion. It is somehow self-evident to people that abrupt movements, for example in an airplane or in a ground transportation vehicle, are undesirable. These movements are typically associated with emergency situations, which may be life-threatening. In fact, human beings are born with what has been termed a "startle response" or a "startle reaction." This much is apparent by observing any infant's response to a sharp movement, like an unexpected drop (e.g., a rapid heave), a sudden lurch forward, backward, or sideways, (e.g., rapid surge or sway), or a sudden change in orientation (e.g., a rapid roll or change in pitch). The human reaction is reflexive.

While undesirable in day to day life, it has been found, that abrupt movements are particularly desirable in many amusement park rides. Many of these rides may seek to elicit the startle response from the riders, whether by visual, auditory, or motion/movement stimuli. For example, it may be desirable to abruptly plunge the passengers in a ride vehicle downward by a precise amount of distance (i.e., negative heave) in order to help them experience a bus falling into a hole caused by an earthquake. By way of another example, the excitement of an escape of a vehicle from the jaws of a giant human-eating predator may be enhanced by a forceful and sudden tipping of a ride vehicle sideways (e.g., a sudden roll to right or left by a precise amount), in coordination of the change in yaw, and forward velocity of the vehicle. By way of still another example, avoidance of a vehicle replicating a submarine from an oncoming torpedo, or an airplane from an oncoming missile, may demand an immediate nose down dive (e.g., an abrupt negative change in pitch by a precise amount) coordinated with a drop (e.g., a negative heave). While scenery and visual illusions may have a part to play in simulating these movements, it is thought that providing the passenger with the true experience of movement in all six, or a subset of the six, degrees of freedom, is the most life-like and therefore the most exciting stimuli a rider can experience.

BRIEF DESCRIPTION OF AN EMBODIMENT OF THE INVENTION

Figure 1:
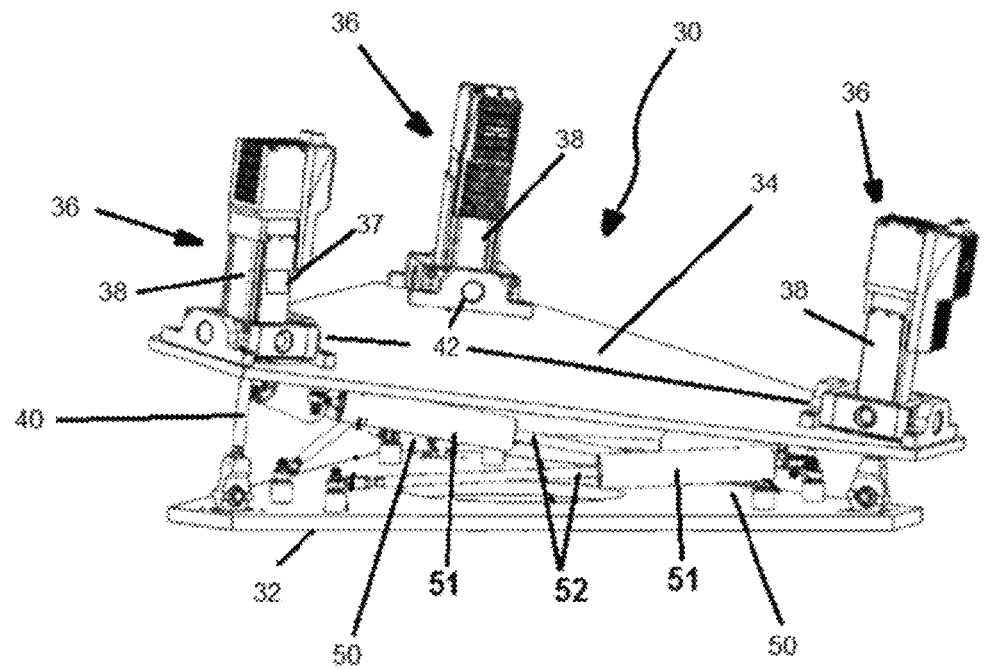
FIG. 1 is a first perspective view of a motion base in accordance with an embodiment of the invention. In this illustration, the motion base is shown in a pitched/rolled state.
Figure 2:
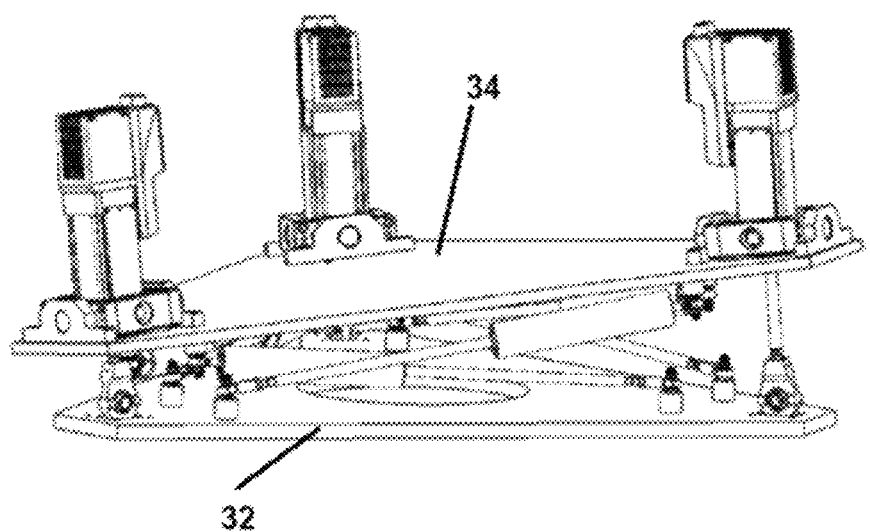
FIG. 2 is a second perspective view of the motion base of FIG. 1. In this illustration, the motion base is shown in a tilted state.

Referring now to FIG. 1, in a first embodiment motion base 30 comprises lower plate 32, upper plate 34, and one or more actuators 36 configured to vary the height and attitude of lower plate 32 relative to upper plate 34.

Typically, lower plate 32 and upper plate 34 have complementary geometries, e.g. substantially triangular geometries, with no more than three actuators 36 disposed towards an outer boundary of upper plate 34, but the geometries, placement, and actual number of actuators 36 may vary, e.g. substantially rectangular geometries with more than three actuators 36.

Actuators 36 may be disposed in various ways. By way of example, one or more actuators 36 may be disposed above upper plate 34, partially above and partially into upper plate 34, in-between upper plate 34 and lower plate 32, partially above and partially into lower plate 32, and/or below lower plate 32. Each actuator 36 includes body 38, within which controllable rod extender 150 (FIG. 13) is housed, and rod 40 that is controlled to selectively extend from and retract into body 38. Although actuators 36 may be linear screw-type actuators, which are preferred, other types of actuators may be acceptable. Active controller 152 (FIG. 13) is typically operatively in communication with controllable rod extender 150 and configured to selectively effect the extension of rod 40 out from and retraction of rod 40 into body 38.

In embodiments, actuators 36 are relatively stiff, as opposed to being compliant. As opposed to compliant actuators, e.g. air actuators, actuators 36 are capable of active actuation in both directions and substantially predictable.

Each body 38 is typically movably coupled to upper plate 34 with a gimbaling, pivoting, swiveling, or articulated joint 42 or the like. An example of an appropriate joint 42 is a universal joint (U-joint). In a preferred embodiment, joint 42 anchors body 38 to upper plate 34 and may provide for some angular freedom of motion of body 38 with respect to upper plate 34. This coupling may permit changes in pitch and roll for actuator 36 and may further provide for a secure upper anchoring point for changes in the overall length of actuator 36. Although actuators 36 may be disposed other than substantially above upper plate 34, those couplings would be similar.

Figure 5:
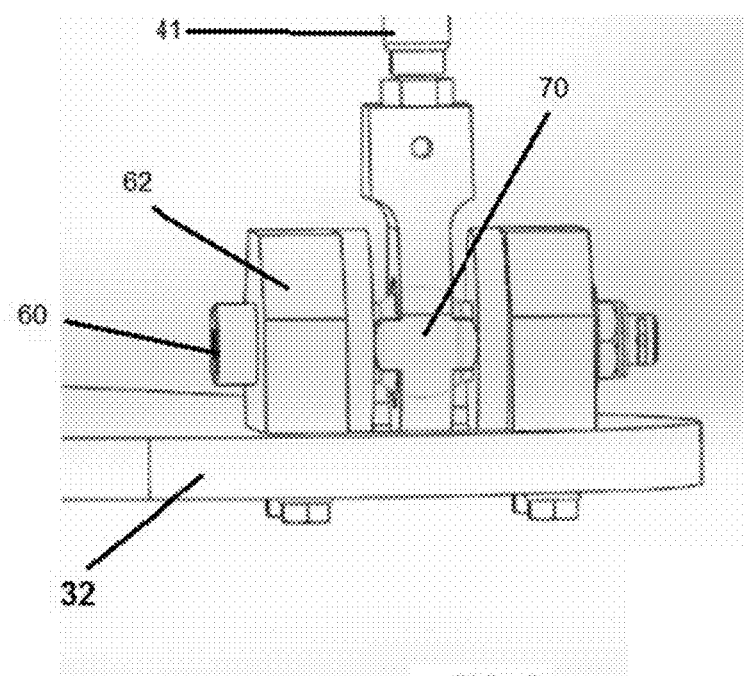
FIG. 5 is a second perspective view of a rod end of an actuator of the embodiment of FIG. 1 mated to the clevis in accordance with an embodiment of the invention.
Figure 6:
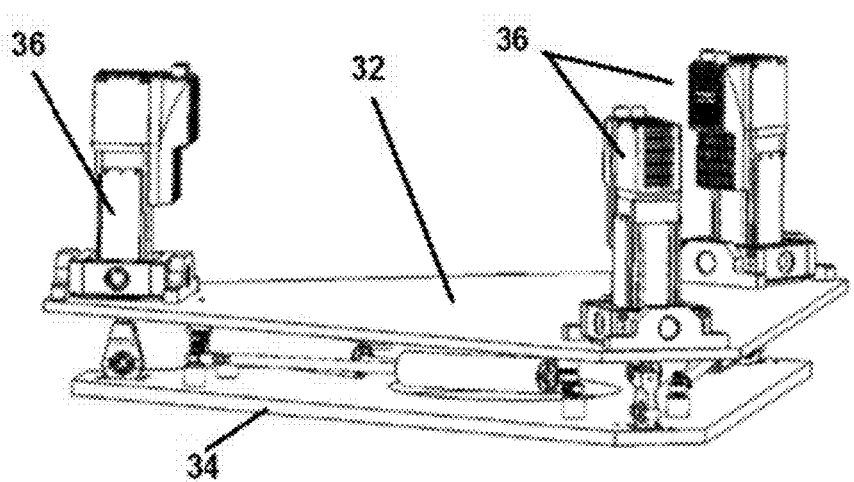
FIG. 6 is a fourth perspective view of the motion base of FIG. 1. In this illustration, the motion base is shown in a lowered state.
Figure 7:
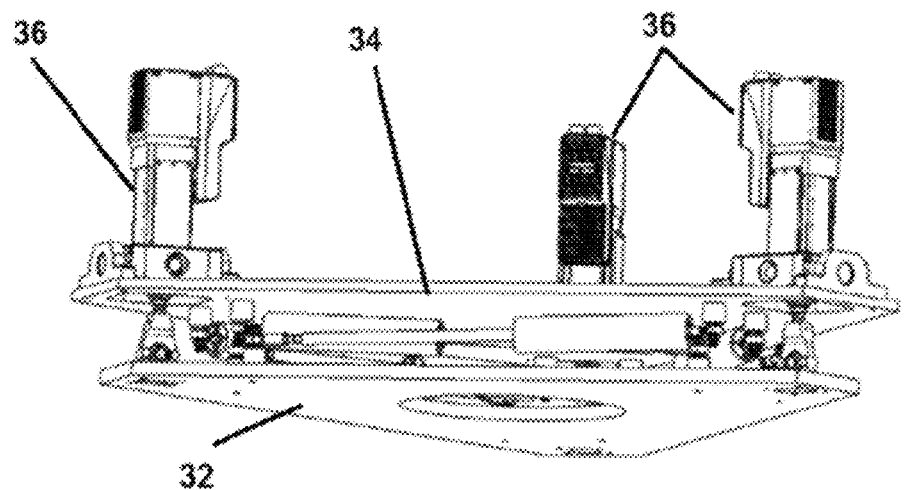
FIG. 7 is a fifth perspective view of the motion base of FIG. 1. In this illustration, the motion base is shown in a lowered state.
Figure 8:
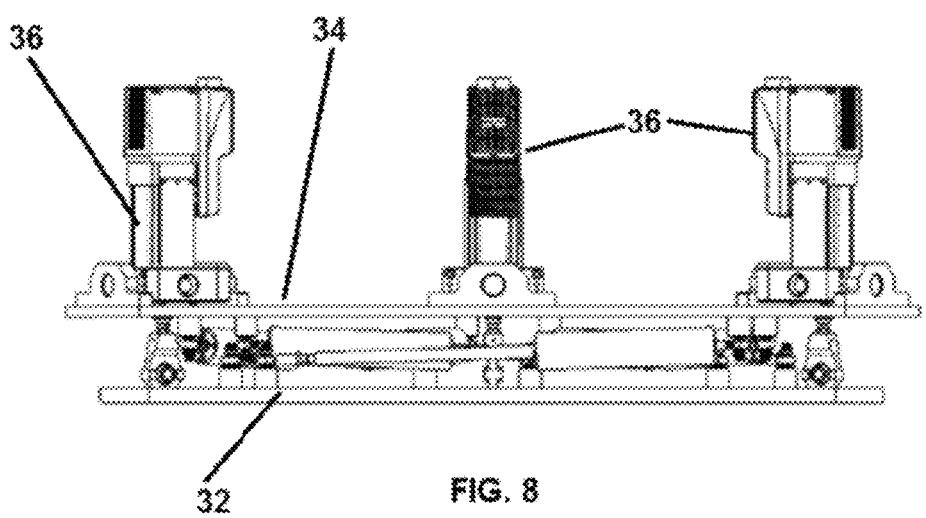
FIG. 8 is a sixth perspective view of the motion base of FIG. 1. In this illustration, the motion base is shown in a lowered state.
Figure 9:
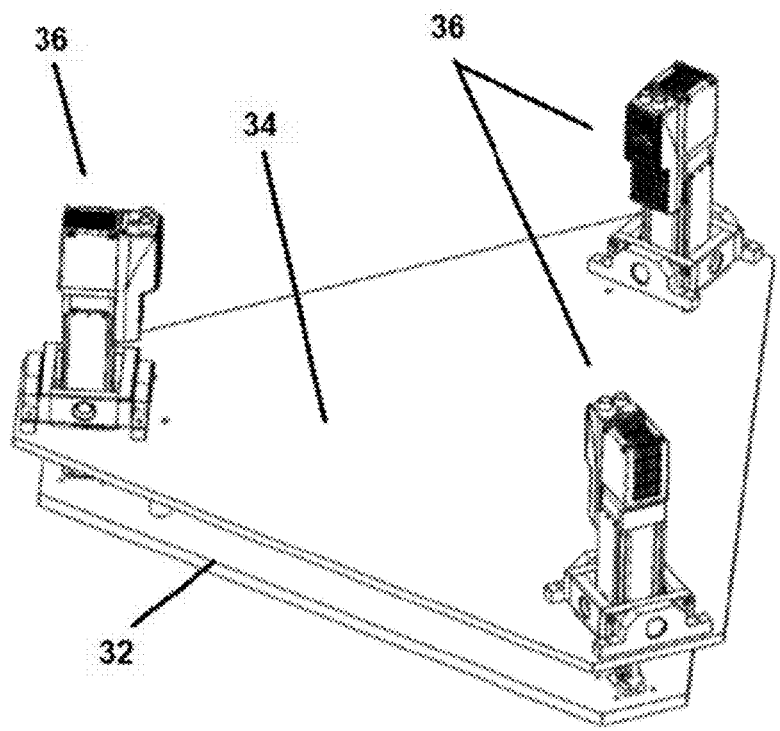
FIG. 9 is a seventh perspective view of the motion base of FIG. 1. In this illustration, the motion base is shown in a lowered state.
Figure 10:
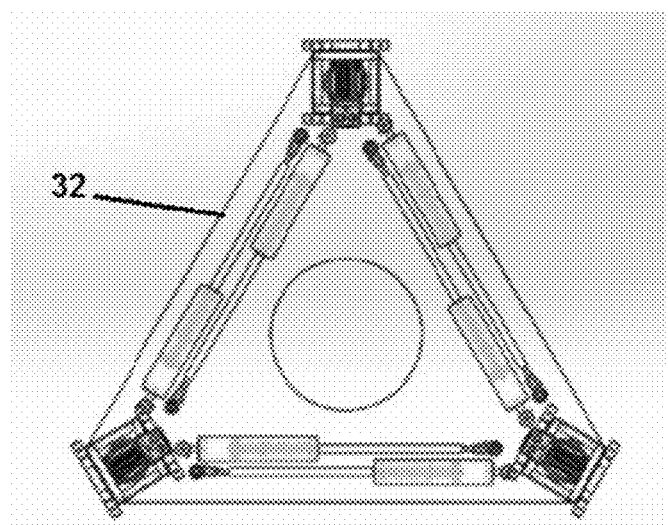
FIG. 10 is a top view of the motion base of FIG. 1, showing a lower plate, a plurality of stabilizer devices, and three actuators, with an upper plate removed, in accordance with an embodiment of the invention.
Figure 11:
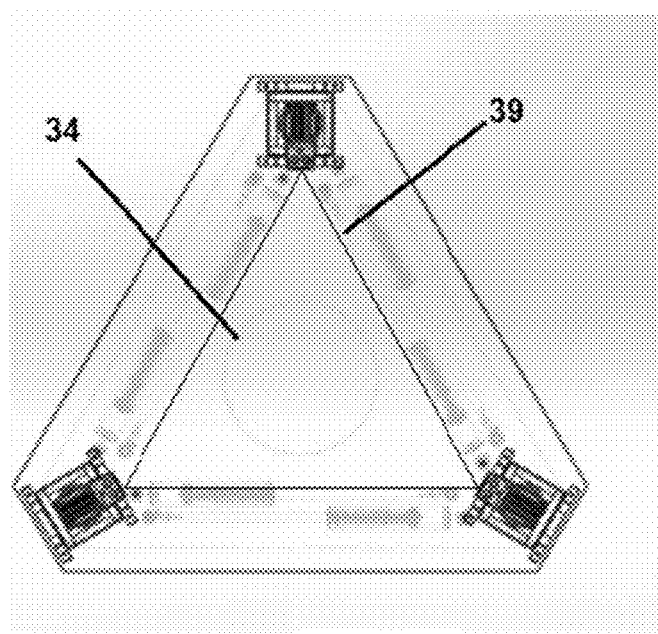
FIG. 11 is a top view of the motion base of FIG. 10 with the upper plate installed, showing the stabilizer devices in dashed lines.
Figure 12:
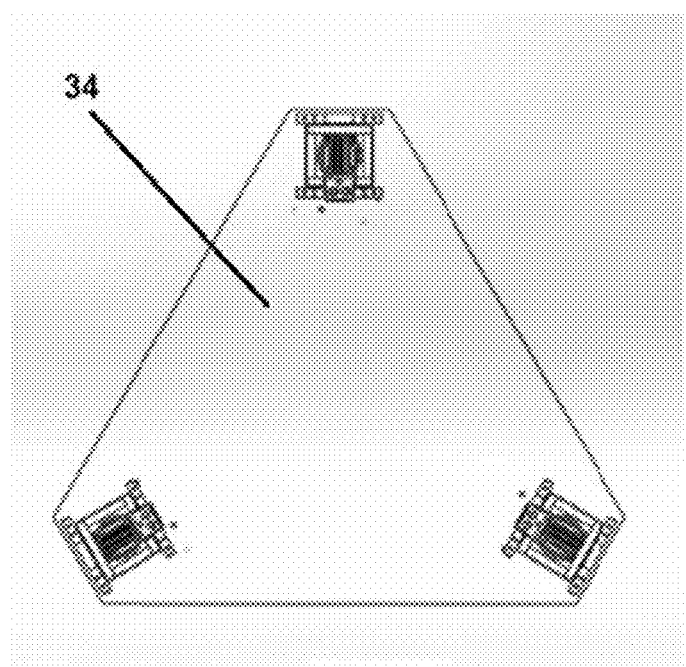
FIG. 12 is a top view of the motion base of FIG. 10 with the upper plate installed.

Rods 40 may be terminated at their distal ends with joints 70 such as spherical bearing and/or ball and socket joints 70 (FIG. 5). Joints 70 may be coupled to lower plate 32 via devises 62. As illustrated in the exemplary embodiment, distal end 41 of rod 40 protrudes from body 38 and is coupled to ball and socket joint 70. Rod 60 may pass through the ball of ball and socket joint 70 and be secured to clevis 62. In this embodiment distal end 41 of rod 40 is anchored to lower plate 32 and may provide for some angular freedom of motion of distal end 41 of rod 40 of linear actuator 36 with respect to lower plate 32. This structure may permit changes in pitch and roll for distal end 41 of rod 40 and may provide for a secure lower anchoring point for changes in the overall length of actuator 36.

Other embodiments permit the gimbaling of distal end 41 of rod 40 with respect to lower plate 32 and other structures may be used to couple bodies 38 and ends of rod 40 to respective upper and lower plates 34, 32, as will be understood by those of ordinary skill in these arts.

As illustrated in the embodiments of FIGS. 1-3 and 6-12, distal ends 41 of rods 40 of actuators 36 are typically disposed towards an outer boundary of upper plate 34 or lower place 32. For triangular geometries of upper plate 34 and lower plate 32, distal ends 41 of rods 40 of actuators 36 are typically disposed adjacent to vertices of an imaginary triangle 39 (FIG. 11) projected onto upper plate 34 and/or lower plate 32. In the embodiment illustrated in the figures herein, an equilateral triangular spacing is presented, bit other triangular geometries may be used.

Brake 164 may be included in body 38, be operatively coupled to screw 162, and be configured to receive a signal to activate/deactivate from active controller 160 which may comprise a servo controller. If actuator 36 comprises a pneumatic or hydraulic actuator, such would typically comprise a cylinder and a rod as opposed to a screw, and brake 164 would be operatively coupled to such a rod, e.g. via one or more rod clamps operatively coupled to such rods.

Figure 13:
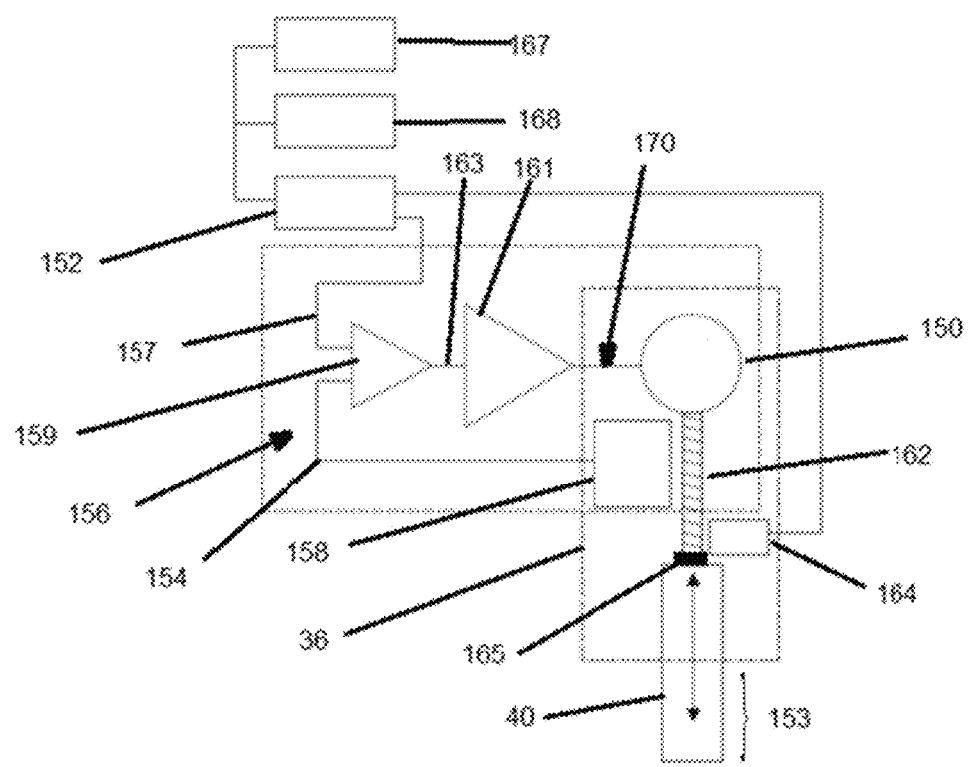
FIG. 13 is a block diagram of a feedback system used in the embodiment of FIG. 1, in accordance with an embodiment of the invention in which the relationships between the various components illustrated in the block diagram (e.g., sensor 158, brake 164, etc.) are not meant to be limiting nor are they intended to represent a preferred physical position relative to another component.

Referring additionally to FIG. 13, actuator 36 comprises controllable rod extender 150, which may comprise a linear actuator electric motor, and may further comprise one or more sensors 158 which may be position sensors, screw 162 which is configured to be driven by controllable rod extender 150 and is coupled to rod 40. Although controllable rod extender 150 is typically an electric motor, other controllable rod extenders, such as hydraulic or pneumatic piston type members, may be used. In embodiments incorporating a driving controllable rod extender 150, driving controllable rod extender 150 may be an electric linear motor and each such driving controllable rod extender 150 may always be operating during normal operation.

Motion base 30 may further comprise a motion control active feedback circuit such as one incorporating corresponding feedback control loop 156 which can be implemented in analog, digital, or hybrid forms. Moreover, although not illustrated, motion control active feedback circuit 156 may comprise one or more servo-systems that include position, velocity, acceleration, impulse (jerk), and/or force, or the like, or a combination thereof in their calculations. Thus, motion base 30 may be implemented with, for example, a position and/or length feedback loop, a velocity feedback loop, an acceleration feedback loop, an impulse (or jerk) feedback loop, a force feedback loop, or the like, or a combination thereof.

In various embodiments, actuator 36 further comprises motor controller 152 typically operationally coupled to and driving controllable rod extender 150 such as via active a corresponding feedback control loop 156.

The speed of controllable rod extender 150 may be variable. In preferred embodiments, the speed of controllable rod extender 150 may be selected to allow for the active extraction and/or retraction of rod 40 from or into body 38 at a rate that may exceed 20 inches per second, but may be preferably in the range of a maximum rate of about 15 to 20 inches per second, at all loads rated for motion base 30. In preferred embodiments, rod 40 may be retracted into body 38 with an acceleration rate of up to and above one G.

If controllable rod extender 150 is a rotatable member, the rotation of controllable rod extender 150 may be continuously variable or may be variable in fixed angular amounts to provide a stepped rotation.

One or more processors 168 and associated memories 166 may be included in motion base 30, although only one is illustrated, and one or more processors 168 and associated memories 166 configured to communicate with one or more servo controllers 152 using wired data communications such as via communication bus 170, wirelessly, or the like, or a combination thereof. Servo controllers 152 may, in turn, communicate with actuators 36 such as via communication bus 170, wirelessly, or the like, or a combination thereof and there can be one or more such servo controllers 152 although only one is shown in the illustration of FIG. 13.

Figure 3:
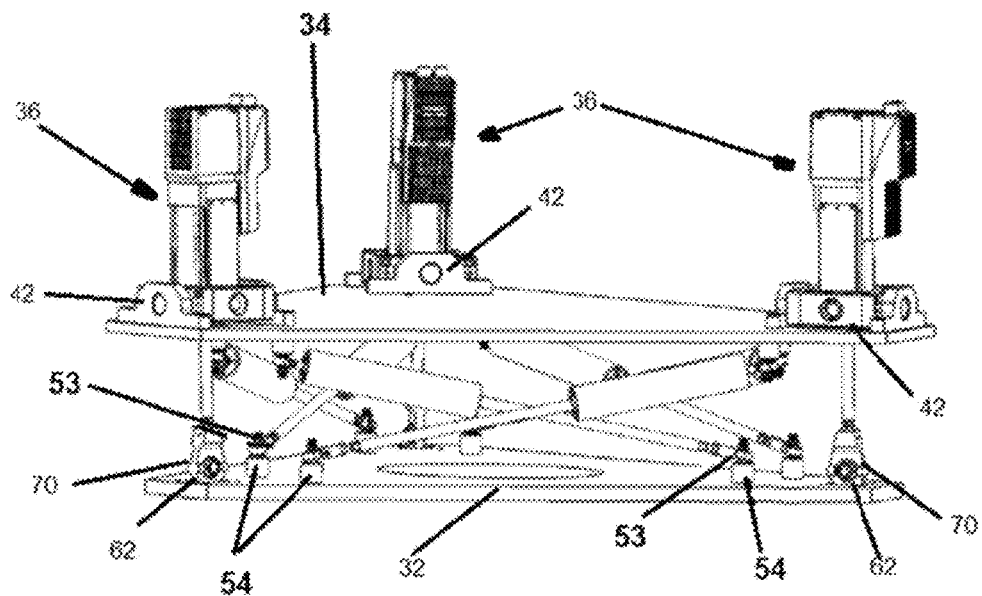
FIG. 3 is a third perspective view of the motion base of FIG. 1 which illustrates a pitched, or rolled, platform.
Figure 4:
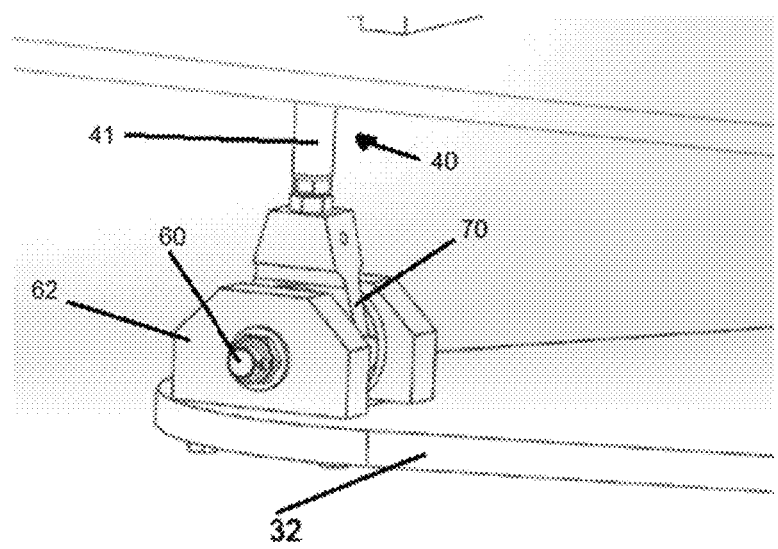
FIG. 4 is a first perspective view of a rod end of an actuator of the embodiment of FIG. 1 mated to a clevis in accordance with an embodiment of the invention.

Also as illustrated in the embodiments of FIGS. 3-5 and 8-14, a plurality of compliant stabilizer devices 50 are typically provided to provide lateral and/or torsional stability between upper plate 34 and lower plate 32. As will be familiar to those of ordinary skill in the motion base arts, compliant stabilizer devices 50 may comprise compliant stabilizer body 51 (FIG. 1) and compliant stabilizer rod 52 (FIG. 1) and be attached to their respective attachment points using, e.g., fasteners 53 (FIG. 3) and, in typical embodiments, bushings or standoffs 54 (FIG. 3).

In the operation of exemplary embodiments, motion base 30 is connected to a load carrier, e.g. a passenger carrier (not shown in the figures) at upper plate 34, via one or more actuators 36, or a combination thereof. In certain embodiments, motion base 30 may further be connected to base mover (not shown in the figures) at lower plate 34, via one or more actuators 36, or a combination thereof.

Sensor 158 comprises a position sensor which may output signal 154 which indicative of present length 153 of an associated actuator 36. However, as discussed below, sensor 158 may be operative to sense the state of one or more parameters such as length, velocity, acceleration, impulse (jerk), force, or the like, or a combination thereof. As used herein, "state and/or value" means state or a value indicative of a state.

Comparator circuit 159 of feedback control loop 156 may receive a first signal via first signal pathway 154 from position sensor 158 as a first input and a second via second signal pathway 157 from active controller 152 as a second input. First signal pathway 154 is typically representative of a current position of actuator 36 and second signal pathway 157 is typically representative of a desired position of actuator 36.

A plurality of active feedback control loops 156, each active feedback control loop 156 comprising an associated first signal pathway 154 and second signal pathway 157 associated with a predetermined controllable rod extender driver, e.g. motor 37 (FIG. 1), of any associated actuator 36, may be present and each associated active controller 152 is configured to receive and compare a signal, which may be directly measured such as via sensor 158, or derived through calculations, that is indicative of a present effective length of the associated actuator 36 to a desired effective length of the associated actuator 36. Active controller 152 may then be further configured to cause its associated controllable rod extender driver 150 to effect a change in the effective length of its associated actuator 36 to minimize the difference between the present effective length and the desired effective length.

In other embodiments, the compared signal may comprise a signal, directly measured via sensor 158 which may comprise a velocity sensor or derived through calculations, indicative of a present rod velocity of the associated actuator 36 which is compared to a desired rod velocity of the associated actuator 36 and cause its controllable rod extender driver 150 to effect a change in the rod velocity of its associated actuator 36 to minimize the difference between the present rod velocity and the desired rod velocity.

In still further embodiments, the compared signal may comprise a signal, directly measured via sensor 158 which may comprise a high order sensor or derived through calculations, indicative of a present state of acceleration, jerk (impulse), torque, force, or other higher-order control parameter or parameters of the associated actuator 36 which is then compared to one or more desired states of control parameters of the associated actuator 36 and of the associated actuator 36. Active controller 152 then may cause its associated controllable rod extender driver 150 to effect a change in the state of the control parameter or parameters of its associated actuator 36 to minimize the difference between the present state of the control parameter(s) and the desired state of those control parameter(s).

Servo amplifier 161, in turn, may receive output 163 from comparator circuit 154 as an input and supply its output as a controlling drive signal to controllable rod extender 150.

In one embodiment, actuator 36 comprises a linear screw-type actuator in which screw 162, which may be referred to herein as a leadscrew or power screw, may be rotated within drive nut 165 such as by a rotating action of controllable rod extender 150. Drive nut 165 is typically restrained from rotating. Therefore, as screw 162 rotates, drive nut 165 is forced upward or downward along the length of screw 162, depending on the direction of rotation of screw 162. Rod 40, which can have a cross section appropriate for its load, can be coupled to drive nut 165 such that rod 40 is pushed from or pulled into its respective body 38, depending on the direction of rotation of screw 162. Other drive nut 165 configurations may be used as well, e.g. ball-screws, roller-screws, and the like, or combinations thereof.

In some embodiments of which comprise electric controllable rod extender 150 comprising a screw type electric linear motor such as an Acme screw type, controllable rod extender 150 may be selected such that when electric drive motor 37 stops, actuator 36 effectively locks in place and supports at least the expected maximum load of motion base 30. However, these types of actuators are not preferred as some amount of friction may be needed to be overcome in order to change the length of the actuator.

Other screw type controllable rod extenders 150, such as ball screw and roller screw type controllable rod extenders 150, have less friction to overcome and may be preferred for embodiments of motion platform 30 described herein. However, these types of controllable rod extenders 150 may drive screw 152 of actuator 36, as opposed to lock onto screw 162 and rotate if power is removed from a driving motor such as controllable rod extender 150. Therefore, in some of the embodiments described herein, brake 164 is used to keep screw 162 from rotating when power is removed from driving controllable rod extender 150. Brake 164 will keep rod 40 from extending or retracting, either directly by acting on rod 40 or indirectly via motor 150 or an intervening gear stage.

In embodiments where driving controllable rod extender 150 is coupled to motor controller 152, first signal 154 indicative of a present extended length 153 of rod 40 and of its corresponding actuator 36, may be input to feedback control loop 156. The first signal may be provided by sensor 158, e.g.

a position sensor, which may be disposed internally in linear actuator 36 or may be provided by a mechanism external to linear actuator 36. Second signal 157, indicative of the desired length of rod 40 and its corresponding actuator 36, may also be input to feedback control loop 156. Second signal 157 may be provided by processor 168 executing commands stored in memory 166 and be based on data presentative of a set of predetermined desired lengths (or changes in actual length to accomplished the desired length) to be transmitted to feedback control loop 156 such as via communication bus 170 during a preplanned sequence of events (such as during any or all segments of travel of the motion base through a ride).

Control of the effective length of actuator 36, to both actively drive rod 40 from body 38 of actuator 36 to extend the overall length and to actively retract rod 40 into body 38 of actuator 36 to reduce the overall length allows precise control the motion of a structure attached to upper plate 34, e.g. a passenger cabin (not shown in the figures), that might be placed on top of motion base 30. It further allows pushing and pulling motion base 30 upward and downward with respect to a predetermined plane with active, powered, and controlled motions. Thus, in typical embodiments, feedback control loop 156, in concert with motor controller 152, compares signals 154 and 157 to compare present length 153 of actuator 36 to a desired length of actuator 36. Acting in concert with its input signals comparator 159 and servo amplifier 161 create a control signal which is provided to motor 150 to change present length 153 of actuator 36 and minimize the difference between the present and desired lengths. when a signal indicative of new desired length 153, such as signal 157, or a signal indicating of new current length such as signal 154, is input to feedback control loop 156, motor controller 152 drives controllable rod extender 150 to achieve that length 153 (or change in length) with precision and with limited oscillatory error relative to the desired length (or change in length).

This allows motion base 36 to substantially eliminate a bounce or oscillating change in distance of separation between lower plate 32 and upper plate 34. Moreover, this configuration permits precise control of the length of each actuator 36 at any given moment during a ride.

The length of linear actuator 36 is minimally affected by the load on the plate being supported by actuator 36, e.g. upper plate 34, by the temperature of actuator 36, or by the momentum of motion base 30 in general at least because feedback control loop 156 is used to compensate for effects that would act to change the actual length of linear actuator 36 away from its desired length.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A motion base, comprising:
  a. a lower plate;
  b. an upper plate;
  c. a plurality of lateral stabilizers disposed in-between and connected to the lower and upper plates, the plurality of lateral stabilizers configured to provide lateral and torsional stability between the lower and upper plates;
  d. a plurality of actuators, each actuator operatively connected to the upper plate and the lower plate, each actuator comprising:
    i. a body;
    ii. a rod movably disposed at least partially within the body, the rod comprising a proximal end disposed within the body and a distal end extending out from the body, the distal end operatively connected to an opposing one of the upper plate or the lower plate, the rod and body defining an actuator effective length; and
    iii. a controllable rod extender operatively coupled to the proximal end of the rod and configured to selectively extend the rod out from and retract the rod into the body, effectively causing the actuator to dynamically change its effective length from a first predetermined length to a second predetermined length; and
  e. an active controller operatively in communication with the controllable rod extender and configured to selectively effect the extension of the rod out from and retraction of the rod into the body.

2. The motion base of claim 1, wherein the controllable rod extender comprises a controllable rod extender.

3. The motion base of claim 1, wherein the controllable rod extender driver comprises an electric motor, an electrically controlled linear motor, a hydraulic piston, or a pneumatic piston.

4. The motion base of claim 1, further comprising a movable joint disposed between one of the bodies and the distal end of the rod that body.

5. The motion base of claim 1, wherein:
  a. the active controller further comprises an active feedback control loop; and
  b. the controllable rod extender comprises a controllable rod extender driver, operatively in communication with the active feedback control loop.

6. The motion base of claim 5, wherein:
  a. the active controller further comprises a sensor operatively in communication with the active feedback control loop; and
  b. the active feedback control loop comprises at least one of a positional feedback control loop, a velocity feedback control loop, an acceleration feedback control loop, an impulse feedback control loop, or a force compliance feedback control loop.

7. The motion base of claim 1, wherein the controllable rod extender comprises a linear Acme screw type actuator, a linear ball screw type actuator, or a linear roller screw type actuator.

8. The motion base of claim 1, wherein the distal end of the rod is disposed adjacent to a vertex of an imaginary triangle projected onto one of the upper and lower plates.

9. The motion base of claim 1, wherein each the rod extension out from and retraction into the body is configured to be continuously variable.

10. The motion base of claim 1, wherein the rod extension out from and retraction into the body is configured to be stepwise variable.

11. The motion base of claim 1, wherein the body and the distal end of the rod are coupled to respective ones of the upper and lower plates via joints configured to allow two rotational degrees of freedom.

12. The motion base of claim 11, wherein the allowed two rotational degrees of freedom do not include heave.

13. The motion base of claim 1, wherein when the rod is configured to prevent the distance between the upper plate and lower plate from oscillating when the rod is moved to stop at a predetermined length.

14. The motion base of claim 1, wherein the actuator is coupled to the upper plate and the lower plate via a U-joint.

15. A method of effecting a change in a relationship between an upper plate of a motion base and a lower plate of a motion base, comprising:
- a. providing a motion base, the motion base comprising:
  - i. a lower plate;
  - ii. an upper plate;
  - iii. a plurality of lateral stabilizers disposed in-between and connected to the lower and upper plates, the plurality of lateral stabilizers configured to provide lateral and torsional stability between the lower and upper plates;
  - iv. a plurality of actuators, each actuator operatively connected to the upper plate and the lower plate, each actuator comprising:
    1. a body;
    2. a rod movably disposed at least partially within the body, the rod comprising a proximal end disposed within the body and a distal end extending out from the body, the distal end operatively connected to an opposing one of the upper plate or the lower plate, the rod and body defining an actuator effective length; and
    3. a controllable rod extender operatively coupled to the proximal end of the rod and configured to selectively extend the rod out from and retract the rod into the body, effectively causing the actuator to dynamically change its effective length from a first predetermined length to a second predetermined length; and
  - v. an active controller operatively in communication with the controllable rod extender and configured to selectively effect the extension of the rod out from and retraction of the rod into the body;
- b. determining a desired effective state of a parameter for each of the plurality of actuators;
- c. determining a current effective state of the parameter for each of the plurality of actuators; and
- d. sending a control signal to each controllable rod extender of each actuator to change the current effective state of the parameter of each actuator if needed to match the current effective state of the parameter to the desired effective length by moving each such actuator's extendable rod into each such actuator's body or moving each such actuator's extendable rod out from each such actuator's body such that the current effective length for each of the plurality of actuators matches the desired parameter for that actuator.

16. The method of effecting a change in a relationship between an upper plate of a motion base and a lower plate of a motion base of claim 15, further comprising:
- a. outputting a signal indicative of present effective parameter of an actuator from a sensor operatively coupled to the actuator, the sensor configured to determine a current state of the parameter;
- b. receiving the output indicative signal as a first input signal at a comparator circuit;
- c. using the comparator circuit to compare the first input signal to a second input signal received from the active controller operatively in communication with the comparator circuit and a processor to create a compared signal;
- d. providing the compared signal to a servo amplifier operatively in communication with comparator and the controllable rod extender; and
- e. using the compared signal to create a control signal that effects a change in the current effective state of the parameter of each actuator as needed, the control signal operative to move an actuator's extendable rod into the actuator's body or move the actuator's extendable rod out from the actuator's body such that the current effective state parameter for the actuator matches the desired effective state parameter for that actuator.

17. The method of effecting a change in a relationship between an upper plate of a motion base and a lower plate of a motion base of claim 15, wherein the controllable rod extender comprises an electric controllable rod extender, the electric controllable rod extender comprising an electric linear motor, the method further comprising using the electric linear motor to effectively lock the electric controllable rod extender in place.

18. The method of effecting a change in a relationship between an upper plate of a motion base and a lower plate of a motion base of claim 15, the controllable rod extender comprising a linear screw-type controllable rod extender comprising a rotatable screw whose length defines an axis, the controllable rod extender further comprising a drive nut configured to rotatably accept the screw within the drive not, the drive nut restrained from rotating, the rod operatively coupled to the drive nut, the method further comprising:
- a. rotating the screw within the drive nut; and
- b. as the screw rotates, forcing the drive nut along the axis in a first direction towards the distal end of the rod or in a second direction away from the distal end of the rod, depending on a rotation direction of the screw and extending the rod out from or retracting the rod into its respective body, depending on the direction of rotation of the screw.

19. The method of effecting a change in a relationship between an upper plate of a motion base and a lower plate of a motion base of claim 18, further comprising using a brake operatively coupled to the screw to keep the screw from rotating when power is removed from the controllable rod extender.

20. The method of effecting a change in a relationship between an upper plate of a motion base and a lower plate of a motion base of claim 15, wherein the controllable rod extender further comprises a controllable rod extender controller operatively coupled to the controllable rod extender and the motion base further comprises a feedback control loop operatively coupled to the controllable rod extender, the method further comprising:
- a. obtaining a first signal indicative of a present effective parameter of the actuator;
- b. inputting the first signal indicative of the present effective parameter of the actuator to the feedback control loop;
- c. obtaining a second signal indicative of a desired effective parameter of the actuator;
- d. inputting the second signal indicative of the desired effective parameter of the rod to the feedback control loop;
- e. generating a compared signal;
- f. providing compared signal to a servo amplifier operatively in communication with the controllable rod extender; and
- g. using the compared signal to send the control signal to each controllable rod extender of each actuator to change the current effective state of the parameter of each actuator as needed by moving each such actuator's extendable rod into each such actuator's body or moving each such actuator's extendable rod out from each such actuator's body such that the current effective state of the parameter for each of the plurality of actuators matches the desired effective state of the parameter for that actuator.

* * * * *